United States Patent [19]

Beckley

[11] 4,265,727

[45] May 5, 1981

[54] COMPOSITE ELECTRODES

[75] Inventor: Don A. Beckley, Newport Beach, Calif.

[73] Assignee: Hitco, Irvine, Calif.

[21] Appl. No.: 87,206

[22] Filed: Oct. 22, 1979

[51] Int. Cl.³ .................... C25B 9/00; C25B 11/12; C25B 11/02
[52] U.S. Cl. .................... 204/242; 204/275; 204/294; 204/290 R
[58] Field of Search .......... 204/290 R, 294, 275–278, 204/286, 242, 149

[56] References Cited

U.S. PATENT DOCUMENTS

| 4,046,663 | 9/1977 | Fleet et al. | 204/294 X |
| 4,130,473 | 12/1978 | Eddleman | 204/294 X |
| 4,197,180 | 4/1980 | Woodward | 204/294 X |

FOREIGN PATENT DOCUMENTS

| 765864 | 9/1971 | Belgium | 204/294 |
| 48-25567 | 7/1973 | Japan | 204/294 |
| 1147853 | 4/1969 | United Kingdom | 204/294 |
| 1434824 | 5/1976 | United Kingdom | 204/294 |

Primary Examiner—G. L. Kaplan
Assistant Examiner—D. R. Valentine
Attorney, Agent, or Firm—Poms, Smith, Lande & Rose

[57] ABSTRACT

Improved graphite composite electrodes are provided by rendering the matrix resin conductive by dispersing therein 5 to 15% by weight of a conductive pigment and by uniformly dispersing therein randomly oriented graphite fibers having a diameter below 30 microns and a length no more than ½ the thickness of the electrode plate. The electrodes are particularly useful in the disinfection of aqueous liquids with low power consumption and with very low ablation of the surface of the electrode.

20 Claims, 3 Drawing Figures

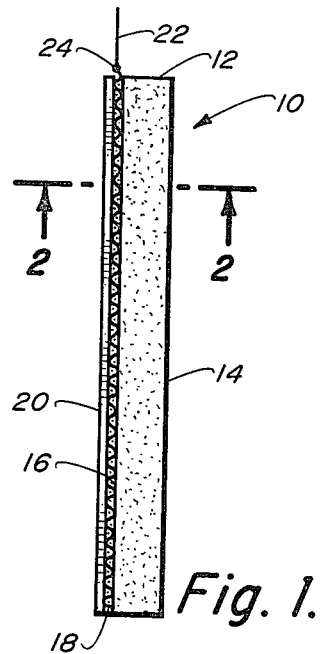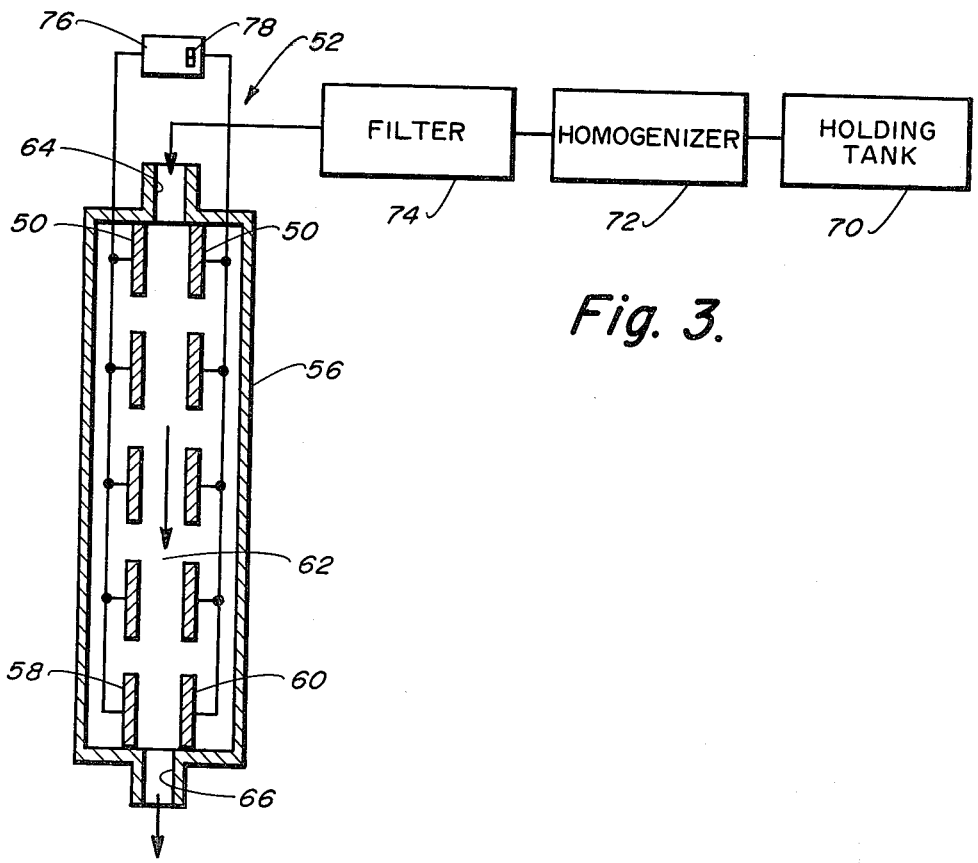

COMPOSITE ELECTRODES

DESCRIPTION

Recently enacted environmental regulations require the disinfection of many liquids before discharge into surface streams. By 1985 the United States Environmental Protection Agency will require shipboard disinfection of all waste water. Other waters requiring disinfection are potable waters, cooling and process waters to control algae growth, hospital nebulizers and contact lens cleaning liquids. Thermal and chemical forms of disinfection and sterilizations are not suitable to most of these uses due to high cost of treatment and energy, and requirements are not suitable for small scale uses.

Electrochemical disinfecting systems have been utilized in the past. The electrodes generally utilized were metal, carbon, graphite or resin impregnated carbon-graphite. These electrodes tend to roughen, foul or deteriorate causing very short service time before requiring cleanup or replacement. Furthermore, these electrochemical systems consume large amounts of electrical power to produce the high field strengths necessary for killing the micro-organisms present in the feed water.

Graphite is desirable electrode material since it can readily and reproducibly be prepared in a low surface area form (pyrolitic or vitreous carbon) and it is stable at anodic potentials where mercury is not useable and all but the noble metals corrode rapidly. Graphite electrodes are also inexpensive and comparatively non-toxic.

Bulk graphite has been employed as an electrode as a support for immobilized enzyme catalysts or to electrochemically regenerate coenzymes such as NaDH-NaD+. They have also been employed occasionally in anodic polarography for analytical purposes. Composite electrodes based on bulk or powered graphite have been used commercially. Resin filled graphite anodes were extensively utilized in the chlor-alkali industry until the development of the titanium dimensionally stable anode (DSA). The graphite anodes had a short life. Five pounds of carbon anode were lost per ton of chlorine produced due to the anodic oxidation of bulk graphite at the comparatively high densities employed in the chlorine caustic cells. Porous graphite electrodes are prepared by sintering into a screen a slurry of graphite, metallic catalyst and particulate hydrophobic polymer.

Fiber reinforced composite materials due to the low weight and high strength are replacing structural metal components in many applications, especially in aircraft and automobiles. Though boron, glass and graphite fibers have been utilized as reinforcement for the binder resins, only graphite is conductive. A typical composite containing 40 to 60% of randomly oriented graphite fibers will have a specific resisivity of 1 to 10 ohm-cm, high enough to be considered for use as an electrode material. Since the fibers are discrete they can function as an array of microelectrodes, each functioning as a point source for reaction.

There has been no reported commercial use of graphite fiber-polymer composites as electrodes. There have been several studies concerned with the electrochemical oxidation of graphite fibers influencing wettability, adhesion and absorption of organic and inorganic substances, but there was no employment of composites as electrodes. One study of graphite fibers as electrodes was concerned with interlaminar shear strength and wettability (Dietz, et al., *J. Materials Science*, 6 (1971), P. 1441).

Recently, graphite composite electrodes have been tested in prototype experimental electrochemical disinfection and potable waters systems. The disinfection reactor operates as a flow-through five plate, four cell, bipolar stack using 30 watts of power to treat influent flow of waste water containing up to 150 p.p.m. of solids. This is a considerable savings of energy, safety and space as compared to chemical disinfection of sewage. Disinfection is improved three-fold over previously studied reactors with resin filled graphite or bulk graphite electrodes. The potable water reactor is also a flow-through, bipolar reactor.

The lifetime of these reactor systems is governed by the physical and electrochemical stability of the electrode plates which must withstand both anodic and cathodic electrolysis in a sea water or sewage environment. Power consumption is governed by compositional and form factors such as the type, size and distribution of the graphite fibers. Though the experimental reactors are demonstrating promising lifetimes and efficiencies, electrodes are subject to deterioration and power consumption has been higher than desired. Furthermore, the kill time for micro-organisms was not optimum nor was the mechanism understood.

DISCLOSURE OF INVENTION

Graphite composite electrodes having improved performance are provided in accordance with this invention. The length and diameter and resistivity of the discrete fibers has been optimized. Though the use of discrete randomly oriented fibers creates a multitude of localized sites for generating disinfecting species, it does not provide a continuous conduction path through the bulk of the electrode. It has further been discovered that the addition of fine, particulate conductive filler to the matrix resin improves kill efficiency and lowers power consumption.

In one form of electrolytic sewage treatment cell an AC square wave is utilized. At low voltage and power, a transient high field is generated which creates a chemical species in the saline solution, probably chlorine, which kills the micro-organisms. The rising voltage is out of phase with the current and is reversed before the electrodes can be damaged. The field strength is enhanced by use of small fibers having a diameter from about 1 to 30 microns, a length from 25 to 6250 microns (1 to 250 mils), preferably 500 to 1500 microns (20 to 60 mils). Higher conductivity fiber is also preferred to enhance field strength which can be controlled by selection of precursor, and firing temperature of precursor during graphitization. Addition of powered graphite to the matrix resin enhances dielectric constant which increases phase displacement. The use of oxidation resistant binder resins has also contributed to significantly increased service life of over several hundred hours. A prototype flow-through cell is capable of disinfecting a urine rich liquid with 2 amperes of current at 15 volts peak voltage using the power consumption of a 30 watt light bulb.

These and many other advantages and attendant features of the invention will become apparent as the the invention becomes better understood by reference to the following detailed description.

BRIEF DESCRIPTION OF THE DRAWINGS

FIG. 1 is a schematic drawing of a plate electrode in accordance with this invention;

FIG. 2 is a cross-section through lines 2—2 of FIG. 1; and

FIG. 3 is a schematic view of a flow-through disinfecting electrolytic reactor.

DETAILED DESCRIPTION OF THE INVENTION

Referring now to FIGS. 1 and 2, the electrode 10 is generally a rectangular plate member having a thickness from about 0.3 to 2.5 cm (1/30 to 1.0 inch) and a length and width from 2.5 to 30 cm (1 to 12 inches) for use in a flow-through disinfection reactor. Large plates can be used for larger capacity reactors and smaller and shaped configurations can be used in applications such as sterilizing contact lenses. The electrode comprises a plate 12 of a graphite fiber filled matrix resin having an active surface 14 for removing pathogens from the liquid electrolyte and a rear surface 16 to which is applied a conductive grid element 18 such as a metal screen adhered to the rear surface by means of a conductive paste adhesive. The screen is embedded in a coating 20 of resin to protect it from the corrosive effects of the liquid to be treated and a conductor 22 is connected to the screen at contact 24, suitably by soldering.

The electrode plate is formed from a composition containing 20 to 70% by volume of graphite fibers, the remainder being oxidation and corrosion resistant binder resin forming the continous matrix for the composite. The matrix preferably contains 5 to 15% by weight of fine grain, conductive powder such as natural monolithic graphite or conductive carbon having a particle diameter smaller than diameter of the fiber, generally from 0.1 to 1.0 microns.

Carbon-graphite fibers suitable for use in this invention can be prepared from organic precursors such as acrylic polymers; polyvinyl alcohol, regenerated cellulose, pitch materials including petroleum residues, asphalt and coal tars. Highly oriented, synthetic polymer precursors such as acrylic polymers provide higher conductivity. Acrylic precursors do not melt prior to pyrolytic decomposition and strength properties of graphitic fibers produced from acrylic precursors are substantially improved over regenerated cellulose based fibers.

The electrical conductivity is approximately five times that for regenerated cellulose based fibers and the degree of graphitization is substantially increased. This results from the fact that acrylic precursors yield a graphitic type of carbon as compared to the nongraphitic type of carbon produced from cellulosic materials. Furthermore, the carbon yield is approximately 45% are compared to only 25% from rayon.

The acrylic precursors may be homopolymers of acrylonitrile or copolymers produced by copolymerizing not less than 85% of acrylonitrile with not more then 15% of monovinyl compound such as methacrylate, methylmethacrylate, vinyl-acetate, vinylchloride, vinylidine chloride, 2-methyl-5-pyridine or the like.

Under application of heat, the precursor polymer cyclizes, that is, forms a six member hexagon ring similar to that found in graphite. Heating in an oxygen containing atmosphere is believed to permit oxygen to diffuse into the structure of the fiber and forms cross-links or chemical bonds between the polymer chains.

The preoxidized fiber is processed to suitably contain between about 5 to 25% oxygen, preferably about 12 to 15% oxygen. The preoxidized fiber is then subjected to firing and graphitization at a temperature above about 1500 degrees C. up to about 3000 degrees C. during graphitization in inert atmosphere.

The monofilaments are then chopped into the desired length and may be polished by tumbling before being incorporated into the resin for forming into an electrode. The matrix resin after being cured is resistant to the chemical and electrical environment of the electrolytic cell reactor. The resin can be a thermoplastic or thermosetting resin. Exemplary resins are polyamide, polyester, phenolic, silicone, polyimide flurocarbon, polysulfone, polyaryl, polyether, polybutadiene or epoxy resins. A portion of the resin can be impregnated onto the fibers before forming the electrode.

The electrode can be formed by casting or molding. Usually pressure is applied during fabrication, generally during curing to remove all voids and gases and to assure that a dimensionally stable structure is prepared. A preferred resin is a stageable, fast curing thermosetting epoxy. The graphite fiber, graphite powder and curing agent are dispersed in a solution of epoxy resin in solvent. After a uniform dispersion is achieved in a mixer, the dispersion is heated to remove solvent, advance the polymer cure to increase viscosity. The dispersion is then placed in a mold and heated at a higher temperature and under pressure to form an electrode plate. The grid screen is then adhesively secured to the back face of the electrode plate with an adhesive paste and the lead conductor soldered to the screen, or the screen can be molded in place during electrode fabrication. The screen and edges of the plate may be coated with further amounts of resin which is subjected to the heat for curing. Alternatively, a conductive grid can be deposited onto the surface of the electrode by vacuum deposit or electroless coating or electrolytic means. In a different configuration the conductive element is applied to a gasket and is in intimate contact with the electrode plate.

An epoxy resin which cures in a short time to a very chemical and oxidation resistant form is epoxidized creosol-aldehyde or phenol-formaldehyde resin or mixtures thereof. The wet mix for the electrode molding composition also includes 0.1 to 3% of an amine hardener such as an amine modified silane, 1 to 12% of a catalyst such as boron trifluoride, 0.5 to 5% of a mold release agent such as a metal stearate and 0.0 to 2% of a pigment or dye such as nigrosine.

EXAMPLE 1

A wet mix was prepared containing the following ingredients:

| Ingredients | Parts, By Weight |
| --- | --- |
| Epoxidized creosolaldehyde resin | 900 |
| Epoxidized phenolaldehyde resin | 168 |
| Diamine coupling agent | 12.0 |
| Boron trifluoride | 96.0 |
| Zinc stearate | 18.0 |
| Nigrosine | 6.0 |
| Flaked graphite (0.5 micron) | 120.00 |

The wet mix was added to graphite fiber in a sigma mixer by pouring over fibers in the mixer and mixing until the fibers were completely wetted out. During mixing, some of the brittle graphite fiber will break down into shorter lengths. The length of the graphite fiber should be no more than ½ the thickness of the electrode plate. Furthermore, shorter lengths of fiber of less than 1/6 inch in length tend to disperse more uniformly throughout the matrix. Longer lengths tend to align parallel to the face, rather than perpendicular thereto. The dispersion was then placed in a 6 inch × 8 inch mold and heated at 350 degrees F. at 2000 psi for about 20 minutes to form ⅛ to ½ inch thick plates. Details of various experiments follow:

TABLE 1

| Fiber Precursor | Diameter Micron | Length Inches | % Fiber By Volume | Thickness of Plates, Inches |
|---|---|---|---|---|
| Pitch | 3–20 | ⅛ | 50 | ⅛ |
| " | " | 1/16 | 30 | 3/16 |
| " | | | 40 | " |
| " | | | 50 | " |
| " | | | 60 | " |
| | | | 70 | " |
| PAN | 9–11 | ⅛ | 50 | 3/6 |

The plates were tested in a protype disinfection electrolytic reactor. The electrodes containing pitch based fibers provided better performance since pitch based fibers have a higher carbon density and the pitch fibers have a smaller diameter. The best performing electrodes contained 50% graphite fiber by volume.

EXAMPLE 2

The procedure of Example 1 was repeated utilizing 5% graphite powder based on resin wet mix and utilizing 50% graphite fiber. The electrodes were molded into mating concave and convex shapes suitable for use as a contact lens cleaning electrolytic unit.

Referring now to FIG. 3, the electrode 50 plates are assembled into a flow-through disinfection reactor 52 in which a plurality of plates such as 6"×8¼"×3/16" are connected in series through the metal grids into a stack. The reactor 52 has a body 56 having a first compartment for receiving anode stack 58, cathode stack 60 and a central channel 62 between the stacks 58, 60 through which electrolytic waste liquid flows from inlet 64 to outlet 66. The NaCl from sea water provides the electrolyte for operation of the cell. If the waste liquid does not naturally include an electrolyte, one must be added as in the contact lens cleaner discussed above.

The liquid from holding tank 70 is processed in homogenizer 72 and filter 74 before being fed to inlet 64. The electrode stacks are connected to AC power source 76. When switch is turned on, the reactor will disinfect urine rich liquid from which fecal solids have been removed with 30 watts of power. Ablation of the electrode faces proceeds in a controlled manner at the rate of only 1 mil per hour.

The electrodes of the invention will also find use as dimensionally stable anodes for chlorine recovery, electrolysis of water, purification of potable water, disinfection of heat exchanger or cooling tower water, anodes for electroplating and the like.

It is to be realized that only preferred embodiments of the invention have been described and that numerous substitutions, modifications and alterations are permissible without departing from the spirit and scope of the invention as defined in the following claims.

I claim:

1. An electrode comprising a shaped member having an electrode face and a rear face defining a thickness, said electrode comprising a composite of a uniform dispersion of randomly distributed graphite fibers having a diameter from 1 to 30 microns and a length of no more than ½ the thickness of the electrode member dispersed in a cured, oxidation-resistant and chemical resistant, continuous matrix resin containing a dispersion of conductive particles selected from graphite and carbon having a diameter smaller than the diameter of the fibers.

2. An electrode according to claim 1 in which the particles have a diameter of from 0.1 to 1 micron.

3. An electrode according to claim 2 in which the particles are graphite flake.

4. An electrode according to claim 3 in which the graphite fiber has a diameter from 3 to 22 microns.

5. An electrode according to claim 4 in which the graphite fiber is a pitch based fiber.

6. An electrode according to claim 5 in which the matrix resin is an oxidation and chemical resistant thermosetting resin.

7. An electrode according to claim 6 in which the resin is an epoxy resin.

8. An electrode according to claim 7 in which the epoxy resin comprises an epoxidized aromatic alcohol-aldehyde prepolymer resin.

9. An electrode according to claim 8 in which the epoxy resin contains a cured mixture of epoxidized creosol-aldehyde and phenol-aldehyde prepolymer resins.

10. An electrode according to claim 1 further including a metal conductive element applied to the rear surface thereof.

11. An electrode according to claim 10 in which the element is a metal screen grid.

12. An electrode according to claim 11 in which the screen grid is adhesively secured to the rear face.

13. An electrode according to claim 10 in which the element is electrodeposited onto the rear face of the electrode.

14. An electrode according to claim 1 in which the member is in the shape is of a flat plate.

15. An electrode according to claim 1 in which the fibers have a length from 25 to 6250 microns.

16. An electrolytic cell comprising in combination:
  walls defining a housing having a compartment for receiving a body of electrolyte,
  an anode electrode within the housing having a front face in a communication with the compartment and having a rear face,
  a cathode electrode within the housing having a front face in a communication with the compartment and having a rear face,
  contact means for connection to the rear faces of said electrodes, and
  at least one of said electrodes comprising a composite of a uniform dispersion of randomly distributed graphite fibers having a diameter from 1 to 30 micron and a length no more than ½ the thickness of the electrode dispersed in a cured, oxidation and chemical resistant, continuous, matrix resin containing a dispersion of fine, particulate conductive filler having a diameter less than the diameter of the fibers and selected from carbon or graphite.

17. A cell according to claim 16 in which the composite electrode includes a plurality of the flat shaped members connected in series in a stack.

18. A cell according to claim 17 in which the conductive filler is graphite or carbon having a diameter from 0.1 to 1 micron, and the graphite fiber is a pitch based fiber having a diameter from 3 to 22 microns and a length of no more than half the thickness of the plate and the plate has a thickness from ⅛ to ½ inch.

19. A cell according to claim 16 in which the matrix resin is an oxidation and chemically resistant epoxy resin.

20. A cell according to claim 19 in which the epoxy resin comprises a mixture of cured epoxidized creosolaldehyde and phenol aldehyde resins.

* * * * *